United States Patent [19]

Pimentel

[11] 4,068,820

[45] Jan. 17, 1978

[54] VALVE

[75] Inventor: Daniel R. Pimentel, Seekonk, Mass.

[73] Assignee: Texas Instruments Incorporated, Dallas, Tex.

[21] Appl. No.: 649,304

[22] Filed: Jan. 15, 1976

Related U.S. Application Data

[62] Division of Ser. No. 500,215, Aug. 26, 1974, Pat. No. 3,974,844.

[51] Int. Cl.² ............................................. F16K 31/00
[52] U.S. Cl. ...................................... 251/11; 251/282
[58] Field of Search .................................. 251/11, 282

[56] References Cited

U.S. PATENT DOCUMENTS

| | | | |
|---|---|---|---|
| 2,826,215 | 3/1958 | Wolfslau | 251/282 |
| 3,304,048 | 2/1967 | Roberts | 251/282 |
| 3,403,238 | 9/1968 | Buehler et al. | 251/11 |
| 3,613,732 | 10/1971 | Willson et al. | 251/11 |

Primary Examiner—Martin P. Schwadron
Assistant Examiner—G. L. Walton
Attorney, Agent, or Firm—John A. Haug; James P. McAndrews

[57] ABSTRACT

A valve device particularly adapted for remote electrical operation at very low power levels has actuator means which are located outside a valve body but which are operatively connected to a valve member within the body through a flexible diaphragm which seals the valve body without excessively restricting movement of the valve member within the valve body. The actuator means are selectively operable for moving the valve member to open and close the valve. Preferably, at least the flexible diaphragm is exposed to fluid pressures within the valve body so that the valve member is normally moved to closed valve position with selected force in response to these pressures when fluid is introduced into the valve body. The actuator means preferably comprises a wire of a selected nickel-titanium alloy which is secured outside the valve body between the body and the valve operating member, the wire being of selected small diameter to be deformed from an original length to a greater length as the valve member is moved to closed valve position with said force while the wire alloy displays a relatively low modulus of elasticity below a transition temperature. However, the wire abruptly returns to its original length and displays a relatively higher modulus of elasticity to move the valve member to open valve position against this force when the wire alloy is heated above its transition temperature. The disclosed valve device includes means directing electrical current through the small actuator wire at low power levels for selectively heating the wire to operate the valve device.

7 Claims, 7 Drawing Figures

VALVE

This is a division, of application Ser. No. 500,215, filed 8.26.74 now Pat. No. 3,974,844.

The operation of fluid control valves usually requires a considerable amount of energy in order to overcome forces which are needed for maintaining leak-tight closure and sealing of the valves. Over the years, various arrangements have been developed for remote, electrical operation of these valves in washing machines and in other household appliances. However, because of the energy levels required for valve operation, these remote operating arrangements have tended to be quite complicated and expensive. Frequently, power supplies of relatively high rating have been required in order to achieve the energy levels necessary for valve operation. Now, with the recent development of solid state control systems for household appliances, it would be very desirable to provide remotely operable fluid control valves which are both inexpensive and reliable and which are operable at the low power levels customarily provided by such solid state control systems.

It is an object of this invention to provide novel and improved fluid control valves; to provide such valves which are remotely operable at very low electrical power levels; to provide such valves which are of inexpensive construction; to provide such valves which are reliable in operation; to provide such valves which close promptly on the occurrence of a power failure or failure of electrical or other components of the valves; and to provide such valves which are of rugged and versatile construction.

Briefly described, the novel and improved valve of this invention includes a valve body having an inlet passage and an outlet passage and having a valve seat between the passages. The valve body has an aperture aligned with the valve seat. A valve member is mounted on the body for movement between an open valve position spaced from the valve seat and a closed valve position engaging the valve seat, the valve member having a stem which extends into the body aperture. A flexible diaphragm of steel material or the like is secured to the valve stem and to the valve body around the body aperture for sealing the valve body. In preferred embodiments of the invention, this flexible diaphragm, as well as other diaphragms and portions of the valve member, are exposed to fluid pressures when a fluid is introduced into the valve body so that the valve member is normally moved to closed valve position with selected force in response to these fluid pressures. Alternately, spring means bias the valve member to closed valve position with selected force. An actuator means such as a wire of a selected nickel-titanium alloy is secured outside the valve body between the body and the valve member stem so that the wire is deformed from an original length to a greater length as the valve member is moved to closed valve position with the noted force while the wire alloy displays a relatively low modulus of elasticity below a transition temperature. However, the wire returns to its original length and displays a relatively higher modulus of elasticity to move the valve member to open valve position against the noted force when the wire is heated above its transition temperature. Means also direct electrical current through the actuator wire for selectively heating the wire for operating the valve device. In this arrangement, the flexible diaphragm effectively seals the valve body while permitting movement of the valve member from outside the body with very low forces. The actuator wire is then adapted to be heated to its transition temperature with input of a very small amount of electrical energy such as can be provided by inexpensive solid state control circuits but is adapted to provide the forces necessary for operating the improved valve device. The valve device is also adapted to close automatically on the occurrence of a power failure or failure of an electrical component of the valve device.

Further objects, advantages and details of the novel and improved valve device of this invention appear in the following detailed description of preferred embodiments of the invention, this detailed description referring to the drawings in which.

Figure 1:
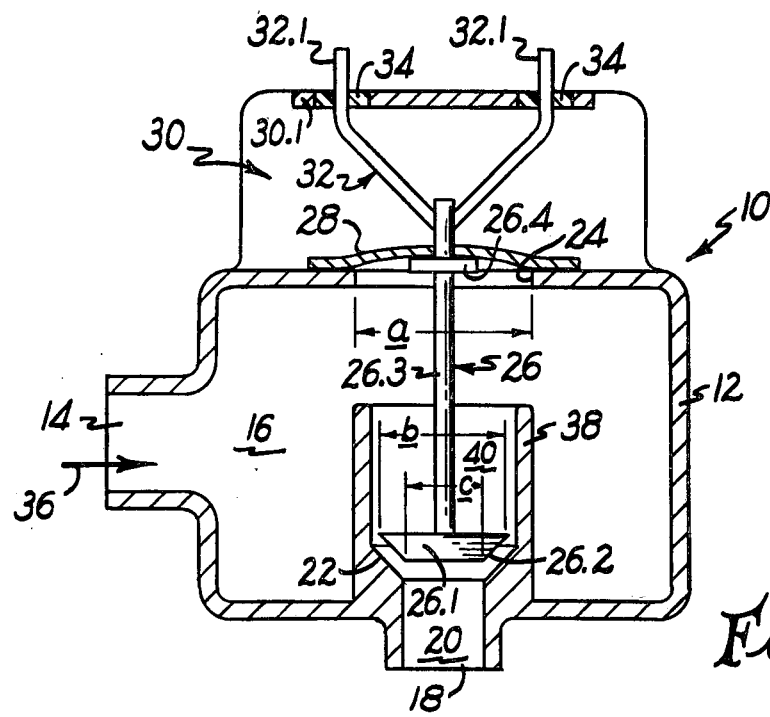
FIG. 1 is an axial section view through a novel and improved valve device of this invention.

Referring to the drawing, 10 in FIG. 1 indicates a preferred embodiment of the novel and improved valve device of this invention which is shown to include a valve body 12, preferably of metal, molded rubber or phenolic resin or other suitably strong and rigid material, having an inlet opening 14 as part of a valve inlet passage 16, having an outlet opening 18 as part of a valve outlet passage 20, and having an annular valve seat 22 located between the inlet and outlet passages. The valve body also has an aperture 24 which is aligned with the valve seat. A valve operating member or plug 26, also preferably formed of metal or molded rubber or the like, has a round disc portion 26.1, preferably with a tapered edge 26.2, and has a round stem portion 26.3 axially extending from the disc into the valve body aperture 24. If desired, the valve seat 22 is lined with a suitably resilient seating material (not shown).

In accordance with this invention, a flexible diaphragm 28, preferably formed of a thin sheet of metal such as stainless steel, rubber, or non-porous plastic material or the like is secured to the valve stem and to the valve body around the aperture 24 for sealing the valve body while operatively connecting the diaphragm to the valve member. Typically, for example, the valve stem has a flange portion 26.4 and the diaphragm 28 is welded to this flange entirely around the valve stem, and is welded to the valve body entirely around the aperture 24. In this arrangement, the valve member 26 is movably supported within the valve body on the flexible diaphragm 28 for movement between the open valve position shown in FIG. 1, wherein the valve member is spaced from the valve seat 22, and a closed valve position, wherein the tapered periphery of the valve member disc engages the valve seat around the entire periphery of the valve seat.

The valve body preferably has an integral upstanding boss 30 having a flange portion 30.1 which extends over the body aperture 24. An actuator wire 32 is secured outside the valve body 12 between the valve body and the valve member 26. Typically, for example, the boss flange 30.1 has dielectric bushings 34 secured in apertures in the flange. The actuator wire 32 is then secured in electrically insulated relation to the valve stem 26.3 by any conventional means (not shown) and has its opposite ends 32.1 secured in and extending through the dielectric bushings 34 to serve as control terminals for the valve device 10.

In accordance with this invention, the body aperture 24 has a selected diameter $a$ for permitting a selected area of the flexible diaphragm 28 to be exposed to fluid pressures in the valve inlet passage 16 when water or other fluid is introduced into the valve body as indicated by the arrow 36. As will be understood, the opposite side of the diaphragm 28 is exposed to atmospheric pressure outside the valve body. The disc portion of the valve member 26 also has a selected diameter $b$ providing the valve member with a selected area exposed to fluid pressures in the valve inlet passage and, because of the tapered edge of the disc portion, has a relatively smaller diameter portion $c$ providing the valve member with a relatively smaller area exposed to fluid pressure or atmospheric pressure in the valve outlet passage 20. Means such as the sleeve portion 38 of the valve body cooperate with the disc portion of the valve member to provide a restricted fluid flow portion 40 of the valve inlet passage 16 adjacent the valve seat 22.

In the valve 10, the disc 26.1 and the aperture 24 are proportioned relative to each other and to the restricted passage 40 so that, when water or other fluid is introduced into the valve 10 with the valve in open position as shown in FIG. 1, the fluid or atmospheric pressures exerted on the diaphragm 28 and on the valve disc cooperate with the restricted flow of fluid around the disc to urge the valve member 26 to closed position and to hold the valve member in closed position with selected force. For example, the diameter $a$ of the body aperture 24 and the diameter $b$ of the valve disc 26.1 are typically made about equal so that, with the valve member 26 in open position, the forces applied to the diaphragm 28 and disc 26.1 by fluid pressures in the inlet passage 16 are in approximate balance but so that, with a significant pressure drop occurring over the valve seat due to restricted fluid flow in the passage 40 and with significant drag on the valve disc by this restricted fluid flow, the net force applied to the valve member by drag and fluid pressures in the inlet passage 16 and by atmospheric pressure on the diaphragm 28 is only partly counterbalanced by the fluid pressure applied to the diaphragm 28 in the inlet passage and by the relatively low fluid pressure applied to a relatively smaller area of the valve disc in the outlet passage 20, whereby the valve member is normally urged to closed valve position with selected force in response to these pressures. In closed valve position, the fluid pressures in the valve inlet passage exert counterbalancing forces on the diaphragm 28 and on the valve disc 26.1 while atmospheric pressure on the relatively large area of the diaphragm 28 is only partly counterbalanced by atmospheric pressure on the valve disc in the outlet passage 20 for holding the valve member in closed valve position. Alternately, of course, the valve disc 26.1 is made relatively larger in diameter than the aperture 24 for holding the valve member in closed position with relatively greater force.

In the valve of this invention, the thermally-responsive actuator wire 32 is formed of a nickel-titanium alloy commonly called Nitinol, the alloy preferably having a composition, by weight, of from about 54 to 56 percent nickel and the balance titanium. As is well known, this material is characterized in that, as the material is heated through a short transition temperature range, the material undergoes a crystalline transformation and displays a very sharp or abrupt change in physical properties including a very substantial increase in modulus of elasticity, these changes being reversible as the material is again cooled below its transition temperature range. When properly conditioned in well known manner, the material is also adapted to display remarkable shape memory properties as the material is heated through its transition temperature range. For example, when the alloy material of the wire 32 is deformed while below its transition temperature by drawing the wire to increase the wire length up to about 8 percent, the wire is adapted to subsequently display remarkable shape memory and to sharply shorten in length when the wire is thereafter heated above its transition temperature. After subsequent cooling of the wire below its transition temperature, the wire is again easily deformed by drawing or stretching to again prepare the wire for displaying its shape memory. Typically, for example, the wire 32 is formed of a nickel-titanium alloy comprising about 55 percent nickel, by weight, and the balance titanium, this alloy having a transition temperature at about 60° C. and having other physical properties as follows:

Ultimate tensile strength — 125,000 psi
Density — 6.5 g./cc.
Heat capacity — 0.077 cal./° C./g.
Resistivity — $80 \times 10^{-6}$ ohm-centimeters
Young's Modulus (below transition temperature) — $3 \times 10^{-6}$ psi
Young's Modulus (above transition temperature) — $12 \times 10^{-6}$ psi It should be understood, however, that other metal alloys displaying corresponding properties are also embodied in the wire 32 within the scope of this invention.

In this arrangement of the valve 10 the diameter of the aperture 24 and the valve disc 26.1 are proportioned with respect to the restricted fluid flow passage 40 and to each other so that, with the material of the wire 32 below its transition temperature, the force moving the valve member 26 to closed valve position when fluid is introduced into the valve inlet passage 16 is great enough to apply sufficient force to the wire to deform the wire to increase the wire length, preferably by at least about 4 percent, as the valve member is moved to closed valve position. However, electrical current is adapted to be directed through the wire 32 between the control terminals 32.1 for electrically self-heating the material of wire 32 above its transition temperature so that the wire is sharply shortened in length and sharply increased in modulus of elasticity for moving the valve member 26 against the noted force for moving the valve member to open valve position. As will be understood, when the material of the valve 32 is thereafter permitted to cool below its transition temperature, whereby the modulus of elasticity of the wire material is returned to its low initial level, the force applied to the valve member 26 by the selected fluid and atmospheric pressures again deforms the wire 32 to increase the wire length and to return the valve member to its closed valve position.

In accordance with this invention, the nickel-titanium material of the wire 32 is adapted to display very high strength when the wire is above its transition temperature and, accordingly, the wire used in the valve 10 is of very small cross-sectional area on the order of $1.5 \times 10^{-5}$ square inches or less. On the other hand, the wire is provided with a relatively very long length. Typically, for example, the wire has a diameter of about 0.002 inches and a length of about 2 inches. In this arrangement, the material of the wire is adapted to be heated to its transition temperature with a very small input of electrical energy at low current levels and the wire is adapted to be heated to its transition temperature from a very low power source. In preferred embodiments of this invention, for example, the wire is proportioned as described so that the valve is operable at power levels of about 2 watts or less or even at about 0.5 watts or less. The double length of the wire 32 arranged between the flange 30.1 and the valve stem 26.3 assures that, when the wire is heated to its transition temperature, substantial force is developed in the wire in the high strength state of the wire so that, at least about 110 grams and preferably on the order of 220 grams, is applied to the valve member for moving the valve member to open valve position.

In this arrangement of the valve 10, the valve is effectively sealed around the valve stem by the diaphragm 28. However, this seal is achieved without imposing any major valve sealing forces on the valve stem that would tend to restrict operational movement of the valve member 26 or which would have to be overcome in moving the valve member 26. In fact, proper proportioning of the valve elements as above-described assures that the valve member is adapted to be seated with a selected force when the valve is in closed position and the force required for moving the valve member to open valve position need only be sufficient to overcome this seating force. Only the single actuator wire 32 is used in operating the valve 10, the forces applied to the valve member 26 by fluid introduced into the valve being adapted not only to close the valve but also to deform the actuator wire 32 longer than its original length for resetting the wire to be subsequently actuated by heating for opening the valve. Further, if a power failure should occur, or if the actuator wire 32 should be broken, the valve 10 is adapted to close automatically in response to the fluid pressures within the valve.

Figure 2:
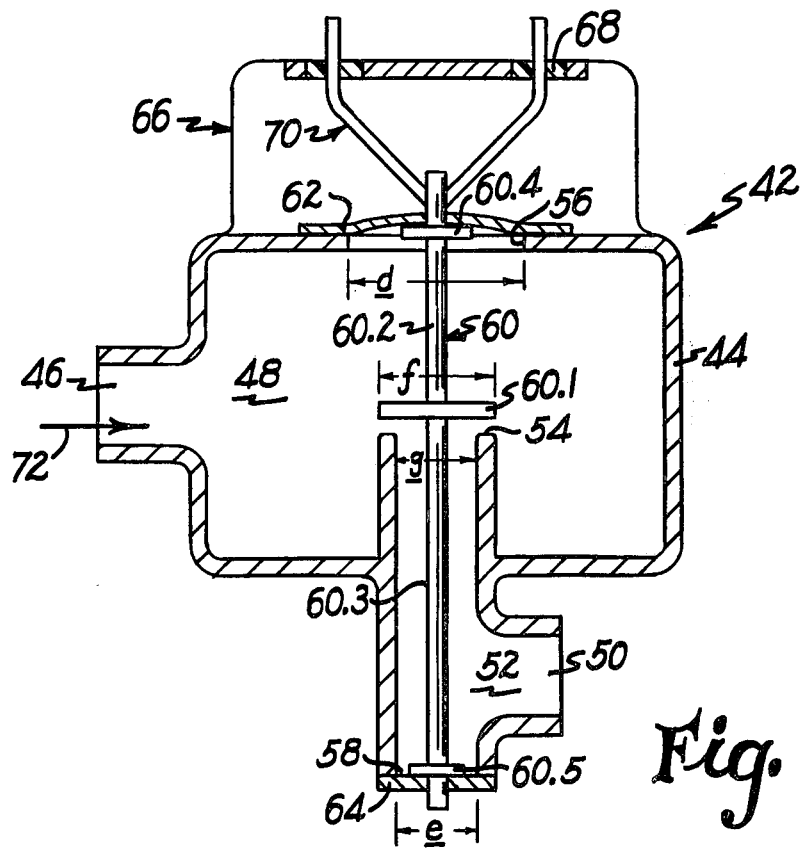
FIG. 2 is a section view similar to FIG. 1 illustrating an alternate embodiment of the valve of this invention.

In another alternate embodiment of the valve of this invention as indicated at 42 in FIG. 2, the valve device 42 includes a valve body means 44 having an inlet opening 46 as part of an inlet passage 48, having an outlet opening 50 as part of an outlet passage 52, and has an annular valve seat 54 located between the inlet and outlet passages. The valve body has apertures 56 and 58 which respectively communicate with the inlet and outlet passages and which are aligned with the valve seat 54. A valve member 60 has a disc portion 60.1 and has a pair of stem portions 60.2 and 60.3 axially extending from respective opposite sides of the valve disc into respective valve body apertures 56 and 58. In this embodiment of this invention, a flexible diaphragm 62 is secured in sealed relation to a valve stem flange 60.4 entirely around the valve stem 60.2 and is secured in sealed relation to the valve body entirely around the body aperture 56. A second flexible diaphragm 64 is secured in sealed relation to the valve stem flange 60.5 around the stem 60.3 and to the valve body around the aperture 58. The valve body is provided with a boss 66, with dielectric bushings 68, and with a thermally responsive actuator wire 70 corresponding to similar components in the valve 10 previously described.

In the valve device 42, the body aperture 56 has a diameter $d$ which is relatively smaller than the diameter $e$ of the body aperture 58 and which is relatively smaller than the diameter $f$ of the valve disc 60.1, the diameter $g$ of the valve disc exposed to fluid pressures in the outlet passage 52 also being relatively smaller than the disc diameter $f$ and the diameter of the aperture 58. In this arrangement, when water or other fluid is introduced into the inlet passage 48 as indicated by the arrow 72 while the valve member 60 is in open valve position as shown in FIG. 2, the fluid pressures exerted on the diaphragm 64 in the outlet passage 52 and the atmospheric pressure exerted on the diaphragm 64 are not counterbalanced by the fluid pressure exerted on the relatively small area of the diaphragm 62 exposed to fluid pressure in the valve inlet passage 48 or by atmospheric pressure on the diaphragm 64. Accordingly, the valve member 60 is normally urged to close valve position when fluid is introduced into the valve. When the valve member 60 is in closed valve position, the fluid pressure applied to the valve disc in the inlet passage 48 and atmospheric pressure on the diaphragm 62 exceed the fluid pressure exerted on the diaphragm 62 in the inlet passage and hold the valve member in closed valve position with a corresponding force. As in the valve 10 previously described, the valve 42 is proportioned so that the fluid pressures normally tending to move the valve member to closed valve position are adequate to deform the wire 70 from an original length to a greater length while the wire material is below its transition temperature. However, when the wire is heated above its transition temperature, the wire abruptly contracts in length for moving the valve member to open valve position against these fluid pressures.

In another alternate embodiment of this invention illustrated in FIG. 3, a valve device 74 incorporates a valve system 42a comparable to the valve device 42 described with reference to FIG. 2, utilizing this valve system as a pilot valve for controlling operation of a main valve system. That is, the main valve system includes valve body means 76 having an inlet opening 78 as part of an inlet passage 80 an outlet opening 82 as part of an outlet passage 84 and has an annular valve seat 86 located between these inlet and outlet passages, portions of these inlet and outlet passages preferably being disposed in side-by-side relation to each other as shown. The main valve body means 76 also provides a portion of a control passage 88 communicating with the outlet passage 84. These inlet, outlet and control passages and the valve seat 86 are preferably arranged in the valve body means 76 so that portions of all of the passages and the valve seat are disposed at one side of the valve body means 76. A flexible diaphragm 90 such as a thin sheet of stainless steel material or the like is secured to this side of the valve body means 76 for flexing movement between a closed valve position shown in FIG. 3, wherein the diaphragm 90 engages the valve seat 86, and an open valve position, wherein the diaphragm flexes away from the valve seat for permitting fluid to flow between the inlet passage 80 and the outlet passage 84. The diaphragm 90 has an aperture 92 of selected size communicating with the inlet passage 80 as shown.

Figure 3:
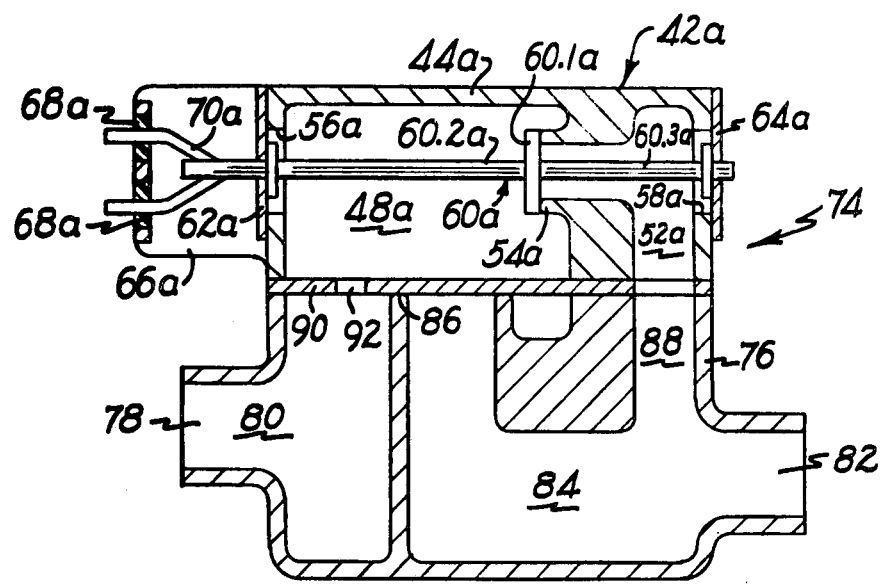
FIG. 3 is a section view similar to FIG. 1 illustrating another alternate embodiment of the valve of this invention.

In accordance with this invention, the valve device 74 also includes a control or pilot valve system 42a corresponding to the valve device 42 previously described, the components of the valve system 42a in the device 74 corresponding to components of the valve device 42 being identified in FIG. 3 by related reference numerals. Thus, the valve system 42a comprises a valve body 44a having a control chamber 48a corresponding to the inlet passage 48 of the valve device 42, having a control passage 52a corresponding to the outlet passage of the device 42, and having an annular valve seat 54a disposed between the control chamber and control passage. The valve body 44a has a pair of apertures 56a and 58a aligned with the valve seat 54a. A control valve member 60a having a valve disc 60.1a has a pair of valve stems 60.2a and 60.3a extending into the apertures 56a and 58a and has flexible diaphragms 62a and 64a secured to the respective valve stems and to the valve body 44a around the apertures 56a and 58a. The valve body 44a includes a boss 66a supporting dielectric bushings 68a and has a thermally-responsive actuator wire 70a secured in the dielectric bushings between the valve body and the valve member 60a. The valve seat 54a defines a control valve opening which is relatively larger than aperture 92 in the flexible diaphragm 90 which separates the control chamber 48a from the inlet passage 80. The control valve 42a has components which are proportioned relative to each other as are the components of the valve device 42 so that the valve member 60a is normally urged to closed valve position having the valve disc 60.1a engaging the valve seat 54a in response to selected fluid pressures in the control chamber 48a, this movement of the valve member 60a being with sufficient force for deforming the wire 70a when the wire material displays its low modulus of elasticity below its transition temperature.

In this valve device 74, with the actuator wire 70a below its transition temperature and with fluid introduced into the valve as indicated by the arrow 94, fluid is introduced into the control chamber 48a through the diaphragm aperture 92 for closing the control valve 42a. As fluid continues to flow in the valve device 74, fluid pressure in the control chamber 48a equalizes the fluid pressure in the inlet passage 80 so that flexing movement of the diaphragm 90 occurs to rest the diaphragm on the valve seat 86 closing the valve device 74. The diaphragm 90 is then held in closed valve position by this fluid pressure in the chamber 48a, which fluid pressure acting on the diaphragm 62a and on the valve disc 60.1a also holds the control valve member 60a in closed valve position. However, when the actuator wire 70a is heated above its transition temperature by directing electrical current through the wire so that the wire contracts in length to move the valve member 60a to open valve position, fluid is drained from the control chamber 48a through the relatively large opening defined by the valve seat 54a faster than fluid enters the control chamber from the inlet passage 80 through the diaphragm aperture 92. Accordingly, fluid pressure in the control chamber 48a falls below that of the inlet passage 80 so that the fluid pressure on the inlet passage moves the diaphragm 90 to its open valve position. The valve device 74 remains in this open valve position as long as the actuator wire 70a remains in heated condition. However, on cooling of the wire, the control valve 42a again closes and fluid pressure builds up in the control chamber 48a to again move the diaphragm 90 to closed valve position. In this valve device, operation of the valve 74 is achieved with input of an extremely small amount of electrical energy to the actuator wire 70a as will be understood.

Figure 4:
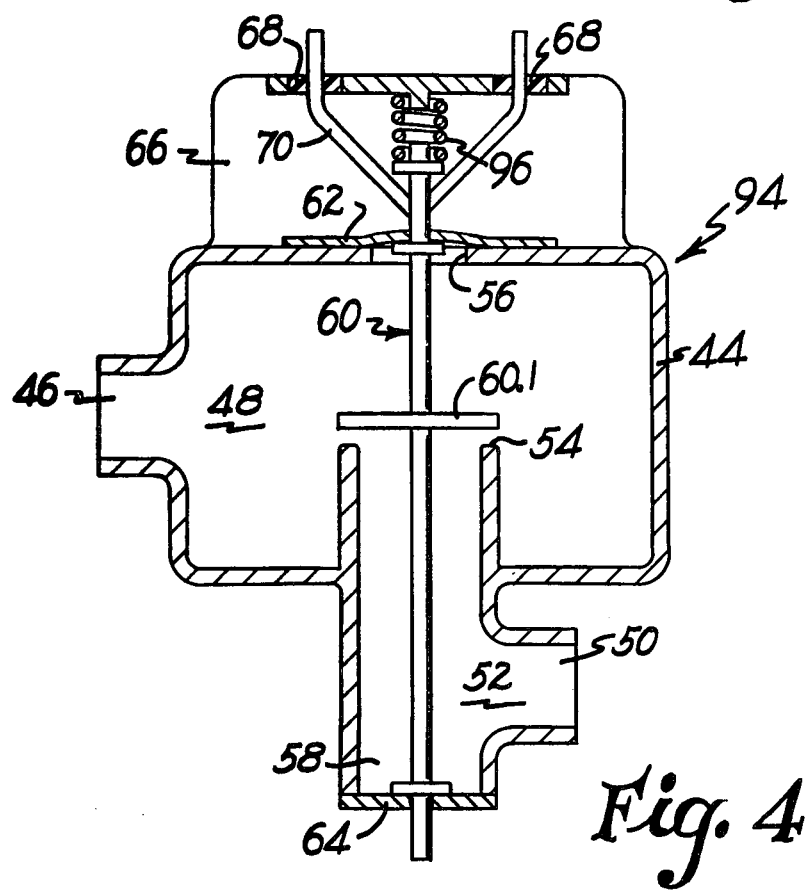
FIG. 4 is a section view similar to FIG. 1 illustrating another alternate embodiment of the valve of this invention.

In another alternate embodiment of this invention illustrated at 94 in FIG. 4, the valve device substantially corresponds to the valve device 42 previously described, components of the device 94 corresponding to components of the device 42 being identified by the same numerals in FIG. 4. In the valve 94 however, the valve body apertures 56 and 58 and the valve disc 60.1 are proportioned relative to each other so that, with the valve member 60 in open or closed valve postion, the fluid pressure forces exerted on the valve member 60 are substantially balanced. Typically, for example, the apertures 56 and 58 and the valve disc 60.1 are of substantially equal diameter. Accordingly, with the valve member 60 in open valve position, the forces applied to the diaphragms 62 and 64 by the fluid pressures within the valve passages and by atmospheric pressure outside the valve body are substantially balanced. Similarly, with the valve member in closed valve position the fluid and atmospheric pressures applied to the diaphragm 62 and to the valve disc 60.1 are also balanced. In the device 94, therefore, the thermally-responsive actuator wire 70 is adapted to move the valve member 60 to open valve position in the manner previously described with reference to FIG. 2. However, a spring member 96 is disposed between the boss 66 and the valve stem 60.2 for normally biasing the valve member to closed valve position. The spring applies selected force to the valve member 60 such that contraction of the wire 70 on heating thereof is adapted to move the valve member to open valve position against the spring bias but such that, when the wire 70 cools and displays its relatively lower modulus of elasticity, the spring bias moves the valve member 60 to closed position and simultaneously deforms the wire 70 for resetting the wire to again display its shape memory properties.

Figure 5:
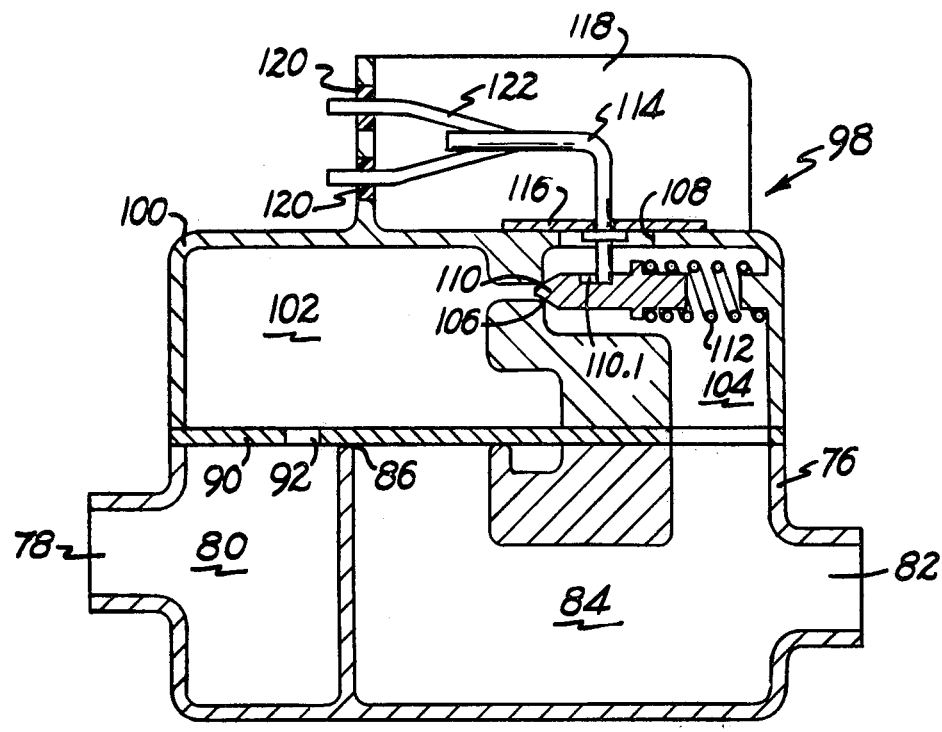
FIG. 5 is a section view similar to FIG. 1 illustrating another alternate embodiment of the valve of this invention.

In still another alternate embodiment of this invention illustrated at 98 in FIG. 5, the valve device has a main valve system corresponding to the valve 74 described with reference to FIG. 3 but incorporates an alternate control valve structure, components of the valve 98 corresponding to components of the previously described valve 74 being identified with the same reference numerals. Thus, the valve 98 includes a valve body 76 having an inlet opening 78 and passage 80, having an outlet opening 82 and passage 84, having a valve seat 86, having a control passage 88, and having a flexible metal diaphragm 90, apertured at 92, secured to one side of the body 76. In the valve 98, an additional control valve body 100 provides a control chamber 102, a control passage 104, and a control or pilot valve seat 106 disposed between the control chamber and passage, the control valve opening defined by the valve seat 106 being relatively larger than the aperture 92 as will be understood. The valve body 100 also has an aperture 108 therein communicating with the control passage 104.

In the valve 98, a valve member 110 is normally biased to a closed position engaging the valve seat 106 by a spring means 112 disposed in the control passage. An operating member 114 has a flexible diaphragm 116 secured in sealing relation to the operating member and to the control valve body around the aperture 108 for sealing the control valve while mounting the operating member for movement within the control valve body by the application of a small force to the member from outside the valve body. The control valve body 100 is then provided with a boss 118, with dielectric bushings 120 and with a thermally-responsive actuator wire 122 corresponding to similar components 66a, 68a and 70a described with reference to FIG. 3.

In operation of the valve 98, heating of the actuator wire 122 causes the wire to display its high modulus of elasticity and to contract in length and pivots the operating member 114 on its diaphragm 116 for moving the control valve member 110 to open position against the bias of the spring 112, thereby bleeding fluid from the control chamber 102 so that the main valve diaphragm 90 moves to open valve position. Upon cooling of the wire 122 so that the wire displays its relatively low modulus of elasticity, the bias of the spring 112 moves the valve member 110 to closed position and redeforms the wire 122, thereby closing the main valve and resetting the wire to again display its shape memory properties as will be understood.

Figure 6:
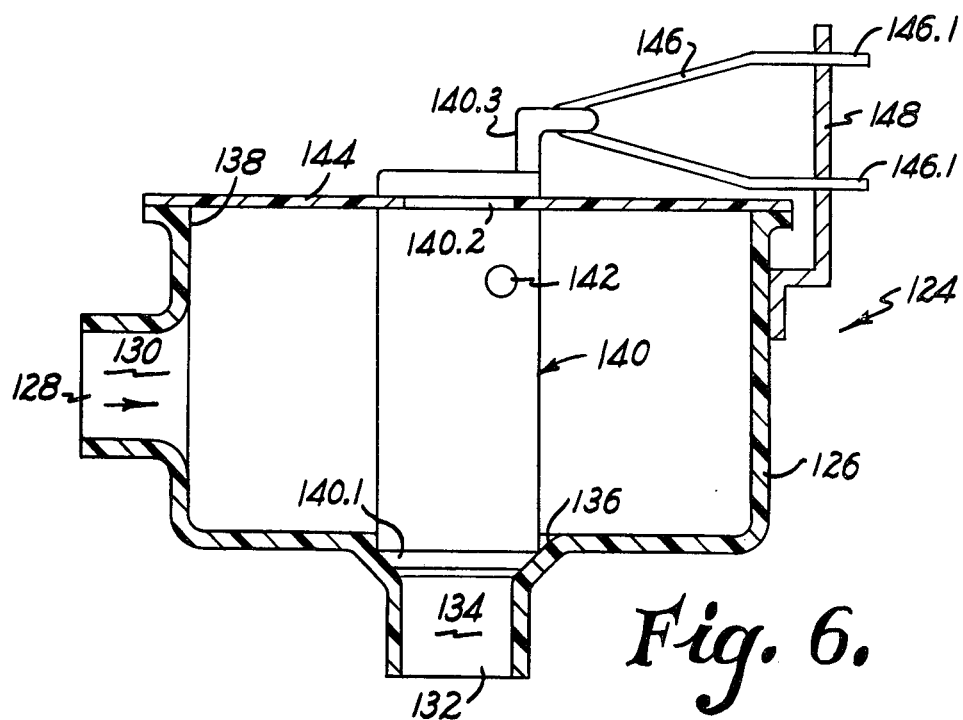
FIGS. 6 and 7 are section views similar to FIG. 1 illustrating another alternate embodiment of the valve of this invention.
Figure 7:
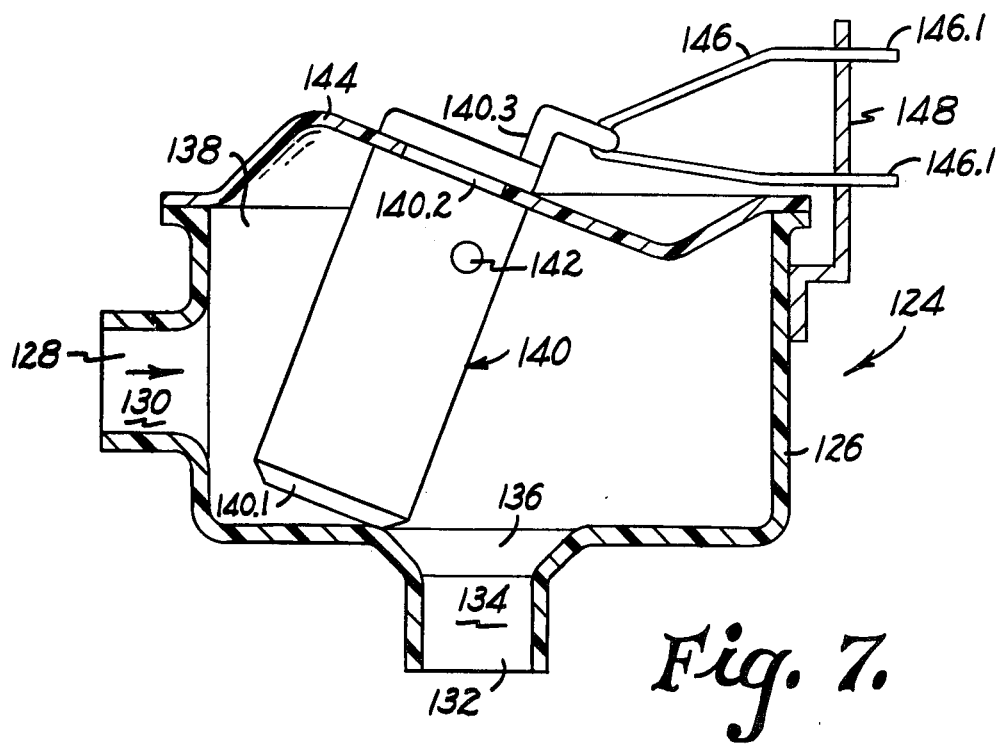

In still another alternate embodiment of this invention illustrated at 124 in FIGS. 6 and 7, the valve device is shown to include a valve body 126 of molded rubber or the like having an inlet opening and passage 128 and 130, having an outlet opening and passage 132 and 134, having a valve seat 136, and having an aperture 138 disposed oppositely of the valve seat in general alignment with the valve seat, and having a generally cylindrical valve member 140 pivotally mounted on the pivot pin 142 which is secured in the walls of the valve body in any conventional way. As illustrated, the valve member 140 has a flange surface 140.1 of a configuration which mates with that of the valve seat for closing the valve device. An annular, flexible diaphragm 144 is shown as being formed of rubber or the like, is cemented or otherwise secured at its inner edge of the groove 140.2 in the valve member and to the valve body around the aperture 138. A valve stem portion 140.3 of the valve member thus extends outside the valve body as shown. An actuator wire 146 corresponding to the actuator wires previously discussed is then secured to the stem portion of the valve member and has its opposite ends 146.1 secured in a bracket 148 to serve as control terminals for the valve device 124, the bracket 148 also preferably being formed of molded dielectric material or the like and being secured to the valve body as shown. Of course, the wire 146 is in its deformed or stretched condition when the valve device is closed as shown in FIG. 6.

In operation of the valve device 124, heating of the actuator wire 146 by directing electrical current through the wire causes the wire material to display its high modulus of elasticity and causes the wire to contract in length for pivoting the valve member 140 from the closed valve position shown in FIG. 6 to the open valve position shown in FIG. 7 wherein the valve member is disposed in the inlet passage 130 so that the valve member is subject to the force of fluid flowing in the inlet passage for urging the valve member back to its closed valve position with a selected force. However, the high strength of wire in its heated condition restrains the valve member in open position against this force. Upon subsequent cooling of the wire 146, as when current flow in the wire is terminated, the wire material again displays its low modulus of elasticity so that the fluid forces tending to pivot the valve member to closed position are sufficient to close the valve and to simultaneously redeform the wire 146 for resetting the wire to again display its shape memory properties.

In accordance with this invention, the flexible diaphragm 144 is proportioned with respect to the location of the pivot pin 142 so that, when the valve member is in closed position as shown in FIG. 6 and when the diaphragm 144 is therefore subjected over the entire area of the aperture 138 to forces resulting from fluid pressure in the valve inlet passage 130, the forces exerted on the diaphragm which would tend to pivot the valve member 140 in a clockwise direction (as viewed in FIG. 6) toward an open valve position are at least counterbalanced by the forces exerted on the diaphragm which would tend to pivot the valve member in the opposite direction toward a closed valve position. Typically, for example, the valve member 140 is pivotally mounted with the center line $a$ of the valve member aligned with the center of the valve seat and with the pivot pin 142 spaced from the center line $a$ oppositely of the valve inlet opening 128 and with the pivot pin 142 located much closer to the diaphragm 144 than to the valve seat 136. The valve inlet passage 130 then includes a chamber 130.1 which is arranged to extend entirely around the valve member 140. Accordingly areas of the flexible diaphragm 144 are exposed to fluid pressure in the valve inlet passage at both sides of the center line $a$ of the valve member as viewed in FIG. 6. The body aperture 138 is preferably arranged somewhat eccentrically with respect to the valve member so that fluid pressures exerted on diaphragm 144 to the left of the pivot pin 142 (as viewed in FIG. 6) are at least counterbalanced by the forces exerted on the diaphragm to the right of the pivot pin (as viewed in FIG. 6). Alternately, the aperture 138 is proportioned and is positioned relative to the valve member 140 so that the forces exerted on the diaphragm to the right of the pivot pin 142 (as viewed in FIG. 6) exceed the forces exerted on the diaphragm to the left of the pivot pin. In these arrangements, where the noted forces on the diaphragm are balanced at either side of the pivot pin 142, the valve member is normally adapted to rest with minimal force in closed valve position when the valve inlet passage is filled with fluid. Alternately, when greater force is applied to the diaphragm to the right of the pivot pin as viewed in FIG. 6, this greater force tends to pivot the valve member for seating the valve member against the valve seat with a selected force when the valve member is in closed position as shown in FIG. 6. Of course, where the pivot pin 142 is located close to the diaphragm 144 and spaced at a considerable distance from the valve seat 136 as shown in the drawings, the valve member is subjected to a very substantial pivoting force from the flow of fluid through the valve inlet passage, over the valve seat and through the valve outlet passage when the valve member is in open valve position shown in FIG. 7. Alternately, the pivot pin 142 is located further from the diaphragm and closer to the valve seat for varying the pivoting force resulting from fluid flow which urges the valve member to closed valve position. In either event, the pin 142 is located so that the valve member is normally urged to closed valve position with sufficient force when fluid is flowing in the valve so that, when the actuator wire 146 is cool, the force is sufficient to close the valve and to redeform the wire 146 for resetting its shape memory.

It will be understood that, although particular embodiments of this invention have been described by way of illustrating the invention, the invention includes all modifications and equivalents of the disclosed embodiments falling within the scope of the appended claims.

I claim:

1. A valve device comprising valve body means having an inlet passage and an outlet passage, having a valve seat between said passages, and having a pair of apertures communicating with said respective passages in alignment with said valve seat, a valve member having a disc portion and having a pair of stem portions extending from respective opposite sides of said disc portion into said respective apertures, said valve member being mounted in said valve body means for movement between an open valve position having said disc portion spaced from said valve seat and a closed valve position having said disc portion engaging said valve seat, a pair of flexible diaphragm means secured to respective valve member stem portions and secured to sealing relation to said valve body means around said respective apertures, said flexible diaphragm means and said valve member disc portion having relative areas to be exposed to fluid in said passages for moving said valve member to said closed valve position with a selected force and for normally holding said valve member in said closed valve position with at least an increment of said force when fluid is introduced into said passages through said inlet passage, an actuator wire of a selected metal alloy secured outside said valve body means between an exterior portion of said body means and a portion of said valve member extending outside the body means through one of said apertures to be deformed from an original length to a second relatively longer length as said valve member is moved to said closed valve position in response to said force while said metal alloy displays a relatively low modulus of elasticity below a transition temperature and to abruptly return to said original length and to display a relatively higher modulus of elasticity to move said valve member to said open valve position against said force when said metal alloy is heated above said transition temperature, and means selectively directing electrical current through said actuator wire for selectively self-heating said metal alloy above said transition temperature.

2. A valve device as set forth in claim 1 wherein the one of said flexible diaphragm means secured to said body means around said aperture communicating with said outlet passage has an area to be exposed to fluid in said outlet passage which is relatively greater than said area of said valve member disc portion to be exposed to fluid in said outlet passage such that said valve device allows selected flow through the valve device in open valve position in response to fluid directed into the valve device through said inlet passage but is self-regulating to deform said actuator wire and to close the valve when the force of said fluid against said one diaphragm means exceeds a selected level.

3. A valve device as set forth in claim 1 wherein said actuator wire is formed of a nickel-titanium metal alloy having a composition, by weight, of from about 54 to 56 percent nickel and the balance titanium.

4. A valve device comprising valve body means having an inlet passage and an outlet passage, having a valve seat between said passages, and having an aperture communicating with said inlet passage in alignment with said valve seat, a valve member having a disc portion and having a stem portion extending from said disc portion into said aperture, said valve member being mounted on said valve body means for movement between an open valve position having said disc portion spaced from said valve seat and a closed valve position having said disc portion engaging said valve seat, flexible diaphragm means secured to said valve member stem portion and secured in sealing relation to said valve body means around said aperture said diaphragm means and valve disc portion having relative areas to be exposed to fluid in said passages for moving said valve member to said closed valve position with a first selected force, spring means outside said body means biasing said valve member to said closed valve position with a second selected force, an actuator wire of a selected metal alloy secured outside said valve body means between an exterior portion of said body means and a portion of said valve member extending outside the body means through said aperture to be deformed from an original length to a second relatively longer length as said valve member is moved to said closed valve position in response to said forces while said metal alloy displays a relatively low modulus of elasticity below a transition temperature and to abruptly return to said original length and to display a relatively higher modulus of elasticity to move said valve member to said open valve position against said forces when said actuator wire is heated above said transition temperature, and means selectively directing electrical current through said actuator wire for selectively self-heating said actuator alloy above said transition temperature.

5. A valve device as set forth in claim 4 wherein said actuator wire is formed of a nickel-titanium alloy having a composition, by weight, of from about 54 to 56 percent nickel and the balance titanium.

6. A valve device comprising valve body means having an inlet passage and an outlet passage, having a valve seat between said passages, and having a pair of apertures communicating with said respective passages in alignment with said valve seat, a valve member having a disc portion and having a pair of stem portions extending from respective opposite sides of said disc portion into said respective apertures, said valve member being mounted in said valve body means for movement between an open valve position having said disc portion spaced from said valve seat and a closed valve position having said disc portion engaging said valve seat, a pair of flexible diaphragm means secured to respective valve member stem portions and secured in sealing relation to said valve body means around said respective apertures, said flexible diaphragm means and said valve member disc portion having equal areas to be exposed to fluid in said passages, spring means outside said body means normally biasing said valve member to said closed valve position with a selected force, an actuator wire of a selected metal alloy secured outside said valve body means between an exterior portion of said body means and a portion of said valve member extending outside the body means through one of said apertures to be deformed from an original length to a second relatively longer length as said valve member is moved to said closed valve position in response to said force while said metal alloy displays a relatively low modulus of elasticity below a transition temperature and to abruptly return to said original length and to display a relatively higher modulus of elasticity to move said valve member to said open valve position against said force when said metal alloy is heated above said transition temperature, and means selectively directing electrical current through said actuator wire for selectively self-heating said metal alloy above said transition temperature.

7. A valve device as set forth in claim 6 wherein said actuator wire is formed from a nickel-titanium alloy having a composition, by weight, of from about 54 to 56 percent nickel and the balance titanium.

* * * * *